(12) United States Patent
Kondo et al.

(10) Patent No.: US 9,168,806 B2
(45) Date of Patent: Oct. 27, 2015

(54) VEHICLE HEIGHT ADJUSTMENT APPARATUS

(71) Applicant: AISIN SEIKI KABUSHIKI KAISHA, Kariya (JP)

(72) Inventors: Yusuke Kondo, Niwa-gun (JP); Takanori Suzuki, Nisshin (JP); Atsuto Ogino, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/548,865

(22) Filed: Nov. 20, 2014

(65) Prior Publication Data

US 2015/0151601 A1 Jun. 4, 2015

(30) Foreign Application Priority Data

Nov. 29, 2013 (JP) .................................. 2013-248087

(51) Int. Cl.
*B60G 17/044* (2006.01)
*B60G 21/06* (2006.01)
(Continued)

(52) U.S. Cl.
CPC ............ *B60G 17/044* (2013.01); *B60G 17/017* (2013.01); *B60G 17/056* (2013.01); *B60G 17/0523* (2013.01); *B60G 17/0525* (2013.01); *B60G 17/0565* (2013.01); *B60G 21/06* (2013.01); *B60G 21/067* (2013.01); *B60G 21/073* (2013.01); *B60G 2202/152* (2013.01);
(Continued)

(58) Field of Classification Search
CPC .... B60G 21/06; B60G 21/067; B60G 21/073; B60G 2500/302; B60G 2400/252; B60G 17/0523; B60G 17/0525; B60G 17/056; B60G 17/0565

See application file for complete search history.

(56) References Cited

U.S. PATENT DOCUMENTS 4,869,528 A * 9/1989 Buma et al. ................... 280/5.51
4,975,849 A * 12/1990 Ema ................................ 701/37
(Continued)

FOREIGN PATENT DOCUMENTS

FR      2 671 519 A1   7/1992
JP      2001-246919    9/2001
(Continued)

OTHER PUBLICATIONS

Extended European Search Report issued May 29, 2015 in Patent Application No. 14194352.2.

*Primary Examiner* — Nicole Verley
(74) *Attorney, Agent, or Firm* — Oblon, McClelland, Maier & Neustadt, L.L.P.

(57) ABSTRACT

A vehicle height adjustment apparatus includes: vehicle height adjustment units respectively provided to correspond to wheels of a vehicle body, and adjusting a vehicle height in response to the supply and discharge of a working fluid; a pressure tank storing the working fluid; a compressor pressure-feeding the working fluid; opening and closing valves interposed between the vehicle height adjustment units and the pressure tank; a vehicle height acquisition unit acquiring a vehicle height value of the wheel; and a control unit controlling the vehicle height adjustment unit to adjust a vehicle height, and controlling the compressor, wherein when a vehicle height adjustment speed, calculated from the vehicle height value, is less than or equal to a predetermined threshold value, the control unit drives the compressor to pressure-feed the working fluid to the vehicle height adjustment units.

6 Claims, 6 Drawing Sheets

(51) Int. Cl.
  *B60G 21/067* (2006.01)
  *B60G 21/073* (2006.01)
  *B60G 17/052* (2006.01)
  *B60G 17/056* (2006.01)
  *B60G 17/017* (2006.01)

(52) U.S. Cl.
  CPC ..... *B60G 2400/202* (2013.01); *B60G 2400/252* (2013.01); *B60G 2500/202* (2013.01); *B60G 2500/2021* (2013.01); *B60G 2500/302* (2013.01); *B60G 2800/20* (2013.01); *B60G 2800/202* (2013.01)

(56) References Cited

U.S. PATENT DOCUMENTS

| | | | |
|---|---|---|---|
| 5,087,072 A * | 2/1992 | Kawarasaki | 280/5.503 |
| 6,266,590 B1 * | 7/2001 | Kutscher et al. | 701/37 |
| 6,523,845 B2 | 2/2003 | Stiller | |
| 6,726,189 B2 * | 4/2004 | Folchert et al. | 267/64.16 |
| 8,335,610 B2 * | 12/2012 | Stiller | 701/37 |
| 9,010,785 B2 * | 4/2015 | Gocz et al. | 280/124.16 |
| 2002/0136645 A1 | 9/2002 | Folchert et al. | |
| 2002/0166321 A1 | 11/2002 | Oldenettel et al. | |
| 2006/0049606 A1 * | 3/2006 | Geiger et al. | 280/124.157 |
| 2007/0228676 A1 * | 10/2007 | Stegmann | 280/5.514 |
| 2008/0288138 A1 | 11/2008 | Folchert et al. | |
| 2014/0107892 A1 * | 4/2014 | Coombs et al. | 701/40 |
| 2014/0241859 A1 * | 8/2014 | Hein | 415/115 |
| 2014/0312590 A1 * | 10/2014 | Stabenow | 280/124.16 |
| 2015/0151600 A1 * | 6/2015 | Suzuki et al. | 280/5.514 |
| 2015/0151602 A1 * | 6/2015 | Suzuki et al. | |
| 2015/0151603 A1 * | 6/2015 | Kondo et al. | |

FOREIGN PATENT DOCUMENTS

| | | |
|---|---|---|
| JP | 2006-218911 A | 8/2006 |
| WO | WO 2006125488 A1 * | 11/2006 |

* cited by examiner

VEHICLE HEIGHT ADJUSTMENT APPARATUS

CROSS REFERENCE TO RELATED APPLICATIONS

This application is based on and claims priority under 35 U.S.C. §119 to Japanese Patent Application 2013-248087, filed on Nov. 29, 2013, the entire contents of which are incorporated herein by reference.

TECHNICAL FIELD

This disclosure relates to a vehicle height adjustment apparatus.

BACKGROUND DISCUSSION

In the related art, there is provided a vehicle equipped with a suspension that includes air springs using compressed air and the like. There is also a vehicle equipped with a vehicle height adjustment apparatus using the air springs. There is a so-called closed type vehicle height adjustment apparatus. This type of vehicle height adjustment apparatus increases a vehicle height by supplying high-pressure air stored in a pressure tank to the air springs that change a suspension state of each wheel. The vehicle height adjustment apparatus decreases the vehicle height by discharging the high-pressure air from the air springs and returning the high-pressure air back to the pressure tank. Among the closed type vehicle height adjustment apparatuses, there is a vehicle height adjustment apparatus that uses a pressure difference so as to supply high-pressure air from the pressure tank to the air springs. There is a vehicle height adjustment apparatus that continuously supplies air to the air springs by driving a compressor to pressure-feed air when supply efficiency decreases during the supply of air by a pressure difference. JP 2001-246919A (Reference 1) is an example of the related art.

An automotive engineer designs a vehicle while always keeping in mind the efficiency of design via the use of common components. Even in designing the vehicle height adjustment apparatus, the automotive engineer seeks to use components used for other purposes in the related art, so as to realize the control and operation of the vehicle height adjustment apparatus.

SUMMARY

Thus, a need exists for a vehicle height adjustment apparatus which is not suspectable to the drawback mentioned above.

An aspect of this disclosure is directed to a vehicle height adjustment apparatus including a plurality of vehicle height adjustment units that are respectively provided to correspond to wheels of a vehicle body, and adjust a vehicle height in response to the supply and discharge of a working fluid; a pressure tank that stores the working fluid; a compressor that pressure-feeds the working fluid; a plurality of opening and closing valves that are interposed between the vehicle height adjustment units and the pressure tank; a vehicle height acquisition unit that acquires a vehicle height value of each of the wheels; and a control unit that controls each of the vehicle height adjustment units to adjust a vehicle height, and controls the compressor. When a vehicle height adjustment speed, which is calculated from the vehicle height value acquired by each of the vehicle height acquisition units during a vehicle height increasing process, is less than or equal to a predetermined threshold value, the control unit drives the compressor to pressure-feed the working fluid to the vehicle height adjustment units. According to the aspect of this disclosure, it is possible to determine whether the driving of the compressor is required, and efficiently drive the compressor as necessary, based on the detected results of the vehicle height acquisition units that are used for other purposes in the related art, so as to mainly confirm whether the vehicle height reaches a target vehicle height.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of this disclosure will be disclosed. The configuration of the embodiment illustrated hereinafter, and the action and result (effects) brought by the configuration are only an example. This disclosure can be realized using configurations other than the configuration disclosed in the following embodiment, and various effects (including secondary effects as well) can be obtained by a basic configuration.

Figure 1:
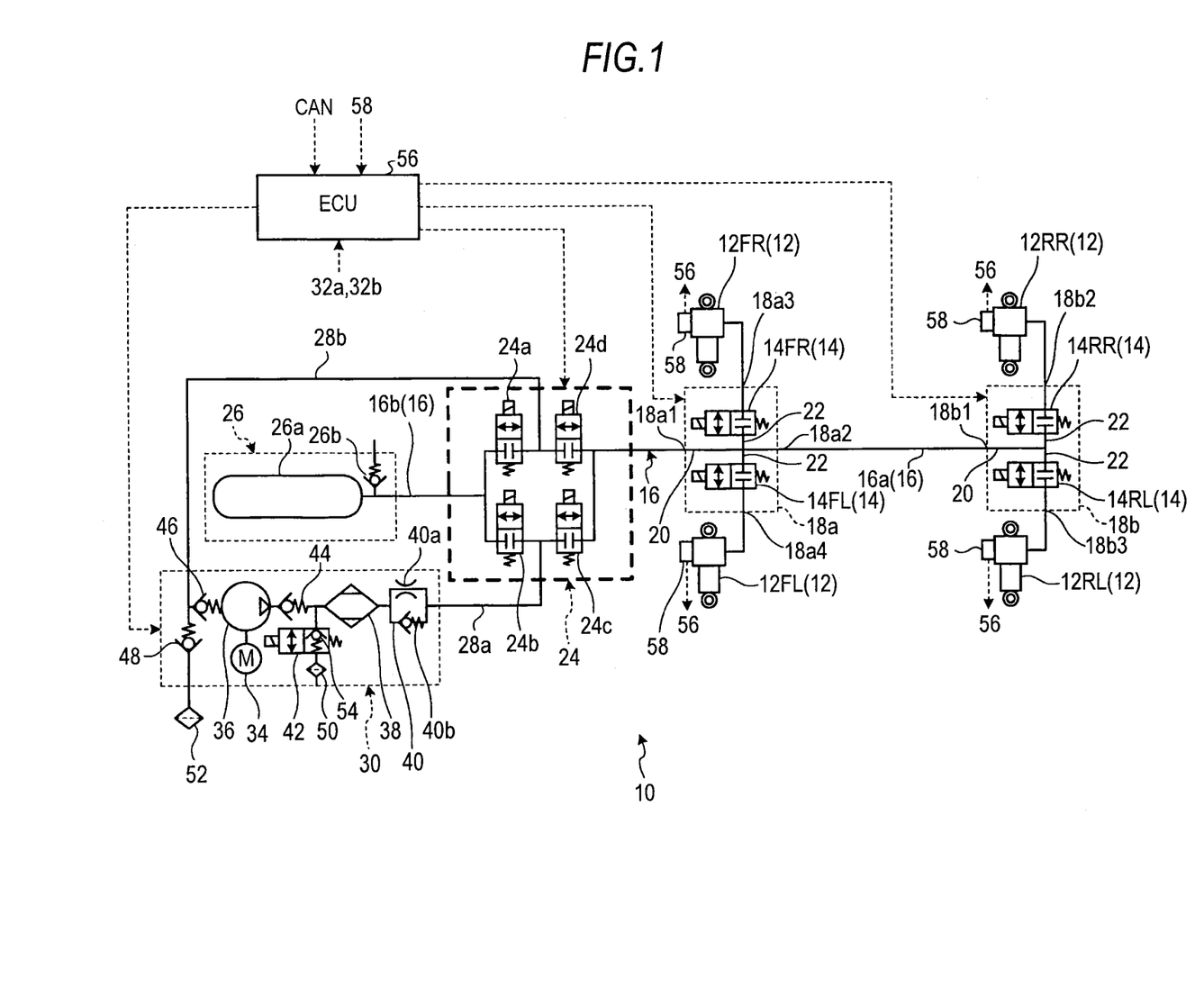
FIG. 1 is a diagram illustrating the configuration of a vehicle height adjustment apparatus according to an embodiment, and illustrates a non-flowing state of a working fluid.

FIG. 1 is a diagram illustrating the configuration of a vehicle height adjustment apparatus 10 according to the embodiment, and illustrates a non-flowing state of a working fluid.

Air springs 12FR, 12FL, 12RR, 12RL (hereinafter, also simply referred to as an "air spring 12" when it is not necessary to distinguish the air springs 12FR, 12FL, 12RR, 12RL therebetween) are respectively connected to the wheels of a vehicle which are not illustrated, and function as vehicle height adjustment units. When the working fluid (for example, air) is supplied to or discharged from the air spring 12, the air spring 12 changes a suspension state of the wheel with respect to a vehicle body of the vehicle. The air spring 12 absorbs the vibration of the vehicle, using the elasticity of compressed air sealed in the air spring 12. The air springs 12FR and 12FL may be referred to as front vehicle height adjustment units. The air springs 12RR and 12RL may be referred to as rear vehicle height adjustment units. A well-known structure can be used in the air spring 12. The air spring 12 absorbs tiny vibrations better than a metallic spring because the air spring 12 uses the elasticity of air. It is possible to maintain a constant vehicle height, adjust the vehicle height to a desired height, or change a spring constant to a desired value by controlling air pressure.

The air springs 12FR and 12FL which are the front vehicle height adjustment units are connected to a main flow passage 16 via respective vehicle height adjustment valves 14FR and 14FL, with the working fluid flowing through the main flow passage 16. Similarly, the air springs 12RR and 12RL which are the rear vehicle height adjustment units are connected to the main flow passage 16 via respective vehicle height adjustment valves 14RR and 14RL, with the working fluid flowing through the main flow passage 16. The vehicle height adjustment valves 14FR, 14FL, 14RR, and 14RL may be simply referred to as a "vehicle height adjustment valve 14" when it is not necessary to distinguish the vehicle height adjustment valves 14FR, 14FL, 14RR, and 14RL therebetween. In the embodiment, the air spring 12 and the vehicle height adjustment valve 14 may be collectively referred to as a vehicle height adjustment unit.

In the embodiment, the vehicle height adjustment valves 14FR and 14FL are disposed by being embedded in a flow passage block made of metal, resin, or the like, and form a front wheel valve unit 18a. Similarly, the vehicle height adjustment valves 14RR and 14RL are disposed by being embedded in the flow passage block, and form a rear wheel valve unit 18b. In another embodiment, the vehicle height adjustment valves 14 may be disposed separately from each other. In this case, the degree of freedom in the layout of the vehicle height adjustment valve 14 improves. The four vehicle height adjustment valves 14 may be integrated into one unit. In this case, it is possible to reduce the number of components by integrating the four vehicle height adjustment valves 14 into one unit.

As illustrated in FIG. 1, each of the front wheel valve unit 18a and the rear wheel valve unit 18b is formed as a separate unit, and the front wheel valve unit 18a can be disposed close to the front wheels. As a result, it is possible to reduce the length of a flow passage tube disposed from the front wheel valve unit 18a to each of the respective air springs 12 of the front wheels, compared to when the entirety of the vehicle height adjustment valves 14 are integrated into one unit. Similarly, it is possible to dispose the rear wheel valve unit 18b close to the rear wheels, and reduce the length of a flow passage tube disposed from the rear wheel valve unit 18b to each of the respective air springs 12 of the rear wheels, compared to when the entirety of the vehicle height adjustment valves 14 are integrated into one unit. As a result, it is possible to facilitate the routing of the flow passage tubes, and reduce potential risk such as damage of the flow passage tubes by reducing the length of the flow passage tubes.

A first port 18a1 is formed in one end surface of the front wheel valve unit 18a, and is connected to the main flow passage 16, and a main flow passage channel 20 is formed inside the front wheel valve unit 18a so as to pass through the front wheel valve unit 18a, with the first port 18a1 being one end of the main flow passage channel 20, and a second port 18a2 being the other end of the main flow passage channel 20. Two secondary flow passage channels 22 are formed inside the front wheel valve unit 18a so as to branch off from the main flow passage channel 20. One end of the vehicle height adjustment valve 14FR is connected to one of the secondary flow passage channels 22, and the other end of the vehicle height adjustment valve 14FR is connected to the air spring 12FR via a third port 18a3. Similarly, one end of the vehicle height adjustment valve 14FL is connected to the other secondary flow passage channel 22, and the other end of the vehicle height adjustment valve 14FL is connected to the air spring 12FL via a fourth port 18a4, A main communication flow passage 16a (the main flow passage 16) is connected to the second port 18a2. The main communication flow passage 16a is connected to a first port 18b1 of the rear wheel valve unit 18b. The main flow passage channel 20 is formed inside the rear wheel valve unit 18b so as to have the first port 18b1 as one end of the main flow passage channel 20. Two secondary flow passage channels 22 are also formed inside the rear wheel valve unit 18b so as to branch off from the main flow passage channel 20. One end of the vehicle height adjustment valve 14RR is connected to one of the secondary flow passage channels 22, and the other end of the vehicle height adjustment valve 14RR is connected to the air spring 12RR via a second port 18b2. One end of the vehicle height adjustment valve 14RL is connected to the other secondary flow passage channel 22, and the other end of the vehicle height adjustment valve 14RL is connected to the air spring 12RL via a third port 18b3.

FIG. 1 illustrates an example in which the front wheel valve unit 18a adopts four ports, and the rear wheel valve unit 18b adopts three ports, but for example, the rear wheel valve unit can adopt four ports similar to the front wheel valve unit. When the rear wheel valve unit 18b adopts four ports similar to the front wheel valve unit 18a, a port corresponding to the second port 18a2 is sealed with a plug cap (blind cap). In this case, it is possible to reduce the number of the types of components, and the design costs by using a common valve unit for the front and rear wheel valve units.

The same type of opening and closing valve can be used in the vehicle height adjustment valve 14 (14FR, 14FL, 14RR, 14RL), and for example, the vehicle height adjustment valve 14 has an ON/OFF controlled solenoid and a spring. Any of the control valves can be a normally closed electro-magnetic control valve that is closed when the solenoid of the control valve is not energized.

The main flow passage 16 is connected to a pressure tank 26 via a circuit valve block 24 and a tank connection main flow passage 16b. The circuit valve block 24 is connected to an outlet of a compressor unit 30 via a compressor outlet flow passage 28a. The circuit valve block 24 is connected to an inlet of the compressor unit 30 via a compressor inlet flow passage 28b. The circuit valve block 24 includes a plurality of the opening and closing valves, for example, four opening and closing valves. Specifically, the circuit valve block 24 includes a first opening and closing valve 24a, a second opening and closing valve 24b, a third opening and closing valve 24c, and a fourth opening and closing valve 24d, A first end of each of the first opening and closing valve 24a and the second opening and closing valve 24b are connected to the pressure tank 26 via the tank connection main flow passage 16b (the main flow passage 16). A first end of the third opening and closing valve 24c is connected to the outlet of the compressor unit 30 via the compressor outlet flow passage 28a, and is connected to a second end of the second opening and closing valve 24b. A second end of the third opening and closing valve 24c is connected to the air spring 12 (the vehicle height adjustment unit and the front wheel valve unit 18a). A first end of the fourth opening and closing valve 24d is connected to the inlet of the compressor unit 30 via the compressor inlet flow passage 28b, and is connected to a second end of the first opening and closing valve 24a. A second end of the fourth opening and closing valve 24*d* is connected to the air spring 12 (the vehicle height adjustment unit and the front wheel valve unit 18*a*).

The same type of opening and closing valve can be used in the first opening and closing valve 24*a*, the second opening and closing valve 24*b*, the third opening and closing valve 24*c*, and the fourth opening and closing valve 24*d* of the circuit valve block 24, and for example, each of the first opening and closing valve 24*a*, the second opening and closing valve 24*b*, the third opening and closing valve 24*c*, and the fourth opening and closing valve 24*d* has an ON/OFF controlled solenoid and a spring. Any of the control valves can be a normally closed electro-magnetic control valve that is closed when the solenoid of the control valve is not energized.

For example, the pressure tank 26 is made of metal or resin, and has a capacity and pressure resistance properties that allow the pressure tank 26 to sufficiently resist against pressure occurring in a flow passage system when a vehicle height adjustment control of the air spring 12 is performed or not performed. The pressure tank 26 has a relief valve 26*b* that reduces the internal pressure of a tank main body 26*a* when the internal pressure is greater than or equal to a set pressure (pressure that is set in advance via testing and the like) due to an unknown reason.

The compressor unit 30 has the following main configurations: the compressor 36 driven by a motor 34; a dryer 38; and a throttle mechanism 40 including an orifice 40*a* and a check valve 40*b*. FIG. 1 illustrates an example in which the compressor unit 30 further includes a relief valve 42; check valves 44, 46, and 48; and filters 50 and 52.

When the pressure difference between the pressure tank 26 and the air spring 12 is less than or equal to a predetermined valve (value that is set in advance via testing and the like) during the execution of a vehicle height increasing control operation, or the working fluid is drawn (returns back) into the pressure tank 26 from the air spring 12 during the execution of a vehicle height decreasing control operation, the motor 34 operates the compressor 36, and the compressor unit 30 pressure-feeds the working fluid. The vehicle height adjustment apparatus 10 of the embodiment is a closed type apparatus that adjusts the vehicle height by moving the working fluid in the flow passages (air sealed in the flow passages from the very beginning when the vehicle height adjustment apparatus 10 is built) between the pressure tank 26 and the air spring 12. Accordingly, basically, external air may not intrude into the vehicle height adjustment apparatus 10, and the vehicle height adjustment apparatus 10 is not affected by environmental changes such as humidity fluctuations. Accordingly, basically, it is possible to remove the dryer 38 or the throttle mechanism 40 from the closed type apparatus. The working fluid (air) in the apparatus may leak to the outside due to an unknown reason. At this time, the apparatus supplements the working fluid therein by suctioning the atmosphere (external air) from the outside via the filter 52 and the check valve 48. At this time, the atmosphere (external air) may contain moisture (humid air) that adversely affects configuration components of the vehicle height adjustment apparatus 10. For this reason, in the vehicle height adjustment apparatus 10 illustrated in FIG. 1, the dryer 38 and the throttle mechanism 40 are provided downstream of the compressor 36. The dryer 38 removes a predetermined amount of humid air from the suctioned atmosphere, and the throttle mechanism 40 adjusts the passing through speed of the atmosphere that passes through the dryer 38. The compressor unit 30 has the relief valve 42 so as to reduce the internal pressure of the vehicle height adjustment apparatus 10 when the internal pressure exceeds a limit pressure due to an unknown reason. For example, the relief valve 42 has an ON/OFF controlled solenoid and a spring, and a normally closed electro-magnetic control valve that is closed when the solenoid is not energized can be used as the relief valve 42. The relief valve 42 of the embodiment has a check valve 54 that allows the flow of the working fluid to the outside without maintaining a closed state of the non-energized solenoid in any of the cases when the internal pressure of the vehicle height adjustment apparatus 10 exceeds the limit pressure (pressure that is set in advance via testing and the like). For example, when the internal pressure of the vehicle height adjustment apparatus 10 exceeds the limit pressure due to the occurrence of an unknown malfunction, the internal pressure opens the relief valve 42 against a biasing force of the check valve 54, and thus the internal pressure is automatically reduced below the limit pressure. The relief valve 42 can be opened based on a control signal from a control unit that will be described later, and thus can reduce the internal pressure of the vehicle height adjustment apparatus 10 regardless of the limit pressure.

In the vehicle height adjustment apparatus 10 with this configuration, a control unit (ECU) 56 of the vehicle height adjustment apparatus 10 controls the vehicle height adjustment unit (the air springs, the vehicle height adjustment valves, and the like which will be described later) to adjust the vehicle height. For example, the ECU 56 can acquire the demand for vehicle height adjustment via a controller area network (CAN); the detected result of a vehicle height sensor 58 that detects an extension and contraction (vehicle height) state of each of the air springs 12.

The vehicle height sensor 58 functioning as a vehicle height acquisition unit is individually disposed for each of the air springs 12, and detects an extension and contraction state of each of the air springs 12 as a vehicle height value. The vehicle height value detected by each of the vehicle height sensors 58 can be used as a value indicative of a supply state of the working fluid to be supplied to each of the air springs 12. For example, it is possible to calculate (acquire) a vehicle height adjustment speed (vehicle height increasing speed) by time-differentiating the vehicle height value acquired by each of the vehicle height sensors 58. For example, a decrease in pressure difference between the pressure tank 26 and the air spring 12 deteriorates a capacity of moving the working fluid from the pressure tank 26 to the air spring 12. At this time, the extending speed of the air spring 12 decreases, and the vehicle height increasing speed decreases. For this reason, when there is a demand for continuously increasing the vehicle height, as described above, the ECU 56 controls the compressor 36 to pressure-feed the working fluid, and continuously adjusts the extension of the air spring 12.

In the embodiment, the ECU 56 determines a timing for driving the compressor 36 based on the vehicle height adjustment speed that is calculated (acquired) using the vehicle height value acquired by each of the vehicle height sensors 58. That is, when the vehicle height adjustment speed is less than or equal to a predetermined threshold value, the ECU 56 determines that a pressure difference between the pressure tank 26 and the air spring 12 is not sufficient enough to allow the working fluid to move therebetween, and drives the compressor 36. In the vehicle height adjustment apparatus 10 of the embodiment, when the vehicle height adjustment speed is continuously less than or equal to the predetermined threshold value for a predetermined period, the ECU 56 controls the driving of the compressor 36. As described above, the vehicle height adjustment speed decreases when a pressure difference between the pressure tank 26 and the air spring 12 is not sufficient, and the vehicle height adjustment speed may decrease temporarily when a load on the air spring 12 increases. For example, when the number of occupants increases, or the amount of cargo increases while an adjustment for increasing the vehicle height is made, the air spring 12 may be temporarily and excessively compressed, and the internal pressure of the air spring 12 may increase. That is, a pressure difference between the pressure tank 26 and the air spring 12 decreases temporarily, and an efficiency of transferring the working fluid to the air spring 12 may decrease. However, thereafter, the convergence of vibration due to the excessive compression of the air spring 12 may stabilize the internal pressure of the air spring 12, and address a phenomenon in which the vehicle height adjustment speed becomes less than or equal to the threshold value. That is, the non-provision of a predetermined delay period for a start of control is one of the causes due to which the compressor 36 is driven at a timing when the driving of the compressor 36 is not ordinarily required yet. In the embodiment, it is possible to prevent the compressor 36 from being driven too sensitively at unnecessary times by providing the predetermined delay period, and controlling the compressor 36 to be driven when the vehicle height adjustment speed is continuously less than or equal to the threshold value for the predetermined period (when a determination delay period elapses). That is, it is possible to appropriately control the compressor 36.

The ECU 56 controls the opening and closing of the vehicle height adjustment valves 14FR, 14FL, 14RR, 14RL, the first opening and closing valve 24*a*, the second opening and closing valve 24*b*, the third opening and closing valve 24*c*, the fourth opening and closing valve 24*d*, and the relief valve 42, or the driving of the compressor 36 (the motor 34), based on the acquired information. FIG. 1 illustrates an example in which the single ECU 56 controls each control target in an integrated manner. However, a control unit may be provided to individually control each control target, or some control units may be provided to control several control targets as a group, and an upper control unit may be provided to control the several control units in an integrated manner.

As such, the vehicle height adjustment apparatus 10 of the embodiment determines whether the driving of the compressor 36 is required, based on the detected results of the vehicle height sensors 58 that are used in the related art so as to primarily confirm whether the vehicle height reaches a target vehicle height. Accordingly, it is possible to efficiently drive the compressor 36 when it is necessary to pressure-feed the working fluid. That is, it is possible to use the vehicle height sensors 58 in common for managing the vehicle height and the driving of the compressor 36. In addition, it is possible to remove a pressure sensor that is necessary for determining whether the driving of the compressor 36 is required in the related art, and reduce the number of components, simplify the structure, and achieve cost reductions.

The vehicle height increasing and decreasing control operations of the vehicle height adjustment apparatus 10 with this configuration will be described with reference to FIGS. 2 to 4.

First, in the following description of the operation of the vehicle height adjustment apparatus 10 with reference to FIG. 2, when a vehicle height increasing control operation is performed, the pressure of the pressure tank 26 is sufficiently higher than that of the air spring 12, and the working fluid (air) can flow from the pressure tank 26 toward the air spring 12 due to a pressure difference between the pressure tank 26 and the air spring 12. As described above, the ECU 56 determines whether the driving of the compressor 36 is required when a vehicle height increasing control operation is performed, based on the vehicle height adjustment speed that is acquired by time-differentiating a vehicle height value detected by each of the vehicle height sensors 58.

When a vehicle height increasing adjustment control operation is performed, a vehicle height adjustment speed is preferably changed based on the situation. For example, an operator may want to increase the vehicle height so as to reduce a burden on the occupant in boarding or deboarding the vehicle. At this time, it is desirable that the increasing of the vehicle height be completed quickly in order for the occupant to be able to board and deboard the vehicle. The operator may preferably want to increase the vehicle height in response to a travelling state (speed, road surface conditions, and the like) when the vehicle is travelling. At this time, the operator desirably increases the vehicle height in an increasing speed range in which the occupant is not uncomfortable while stable travelling is maintained.

When the vehicle height adjustment apparatus 10 performs a vehicle height increasing control operation, the ECU 56 controls the opening and closing of the first opening and closing valve 24*a*, the second opening and closing valve 24*b*, the third opening and closing valve 24*c*, and the fourth opening and closing valve 24*d* of the circuit valve block 24, and the opening of the vehicle height adjustment valves 14FR, 14FL, 14RR, and 14RL.

The vehicle height adjustment apparatus 10 of the embodiment can switch the flow mode (flow direction, flow rate, or the like) of the working fluid by changing the combination of the respective opening and closing states of the first opening and closing valve 24*a*, the second opening and closing valve 24*b*, the third opening and closing valve 24*c*, and the fourth opening and closing valve 24*d* of the circuit valve block 24, For example, when the working fluid flows from the pressure tank 26 toward the vehicle height adjustment unit (the air spring 12) due to a pressure difference therebetween, the ECU 56 can selectively use at least one of first and second flow passage systems. The first flow passage system is formed when the first opening and closing valve 24*a* and the fourth opening and closing valve 24*d* are opened, and the second flow passage system is formed when the second opening and closing valve 24*b* and the third opening and closing valve 24*c* are opened. For example, when the ease of flow of a first flow mode (flow passage opening diameter due to the ease of flow associated with flow resistance) of the first flow passage system is actually the same as that of a second flow mode (flow passage opening diameter due to the ease of flow associated with flow resistance) of the second flow passage system, the ECU 56 selects any one of the first and second flow passage systems. At this time, the working fluid flowing out of the pressure tank 26 via the tank connection main flow passage 16*b* can be supplied to the air spring 12 in a first speed mode (for example, low-speed increasing mode) while passing through the first flow passage system or the second flow passage system, the air spring 12 extends due to the opening of the vehicle height adjustment valve 14, and it is possible to increase the vehicle height at a low speed.

When the ECU 56 selects the first and second flow passage systems, the flow of the working fluid is actually two times easier compared to when the ECU 56 selects any one of the first and second flow passage systems, and the working fluid can be supplied to the air spring 12 in a second speed mode (for example, high-speed increasing mode) faster than in the first speed mode. As a result, the air spring 12 extends due to the opening of the vehicle height adjustment valve 14, and it is possible to increase the vehicle height at a higher speed compared to the first speed mode.

The ECU 56 can switch the ease of flow of the working fluid (flow rate of the working fluid) per unit time period by selecting the first and/or second flow passage systems, and easily change the vehicle height increasing speed. In another embodiment, the first flow mode of the first flow passage system defined by the opening of the first opening and closing valve 24a and the fourth opening and closing valve 24d may be set differently from the second flow mode of the second flow passage system defined by the opening of the second opening and closing valve 24b and the third opening and closing valve 24c. For example, the opening diameter of the opening and closing valves of the first flow passage system may be different from that of the second flow passage system. As a result, when the ECU 56 opens the first opening and closing valve 24a and the fourth opening and closing valve 24d, and selects the first flow passage system, a speed mode becomes the low-speed increasing mode. When the ECU 56 opens the second opening and closing valve 24b and the third opening and closing valve 24c, and selects the second flow passage system, a speed mode becomes a medium-speed increasing mode. When the ECU 56 selects the first and second flow passage systems, a speed mode becomes the high-speed increasing mode.

The first and/or second flow passage systems may be selected multiple times during one vehicle height increasing process. For example, in an initial period of a vehicle height increasing operation, the increasing speed may be set to the first speed mode in which any one of the first flow passage system and the second flow passage system is selected. In an intermediate period, the increasing speed may be set to the second speed mode in which both of the first and second flow passage systems are selected, and which is faster than the first mode. In a final period, the increasing speed may be set to the first speed mode again. It is possible to reduce a shock at the start of the increasing of the vehicle height by starting the increasing of the vehicle height slowly in the first speed mode. It is possible to reduce a time period it takes to complete the vehicle height increasing control operation by changing a speed mode to the second speed mode in the intermediate period, in which the vehicle height is increased at a high speed. It is possible to reduce a shock at the stop of increasing of the vehicle height by switching a speed mode to the first speed mode again and increasing the vehicle height slowly in the final period.

Figure 2:
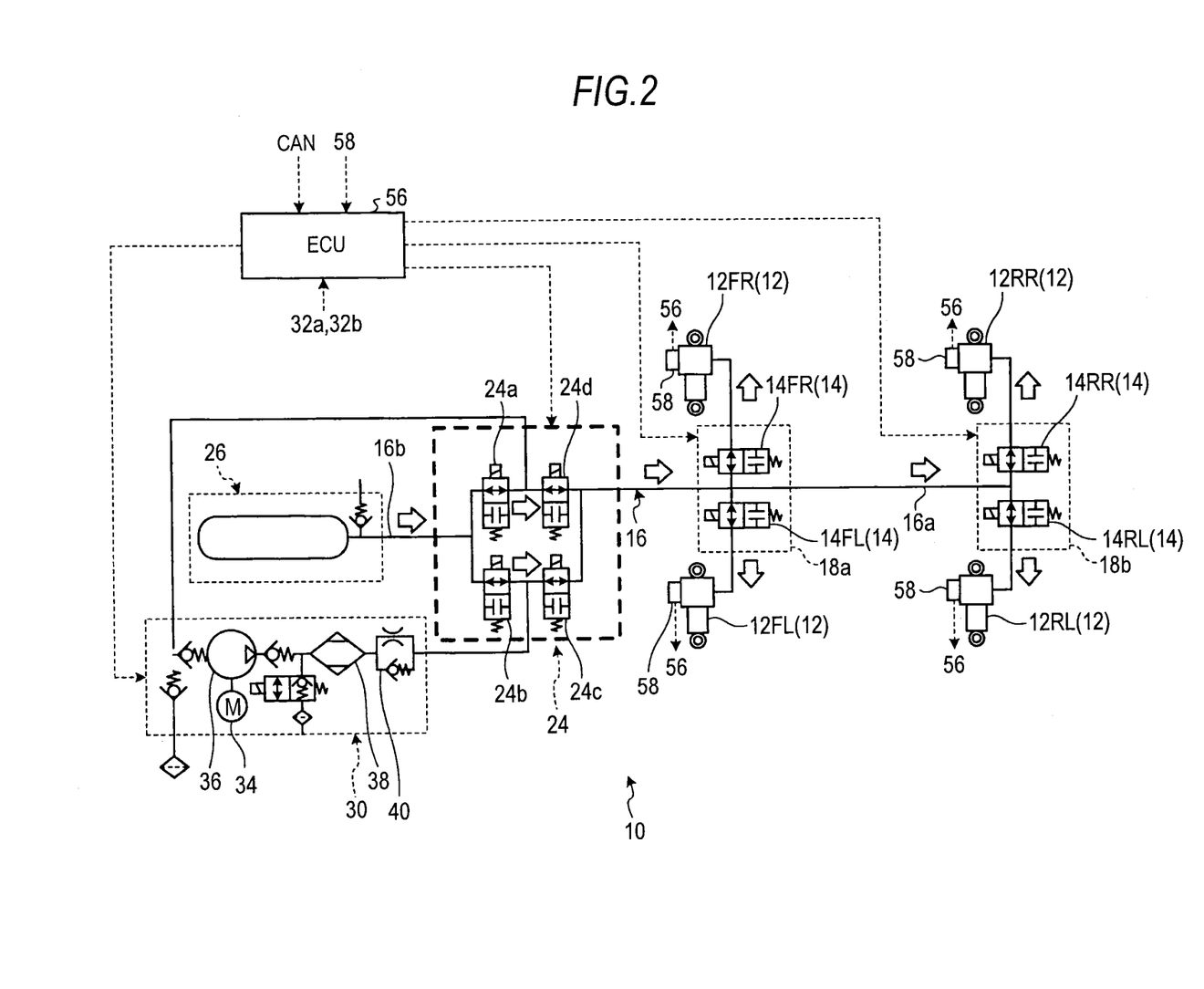
FIG. 2 is a diagram illustrating the state of opening and closing valves and the flow of the working fluid when the vehicle height adjustment apparatus of the embodiment performs a vehicle height increasing control operation without a compressor being driven.

As illustrated in FIG. 2 and the like, in the vehicle height adjustment apparatus 10 of the embodiment, the second end of the second opening and closing valve 24b and the first end of the third opening and closing valve 24c are connected to the throttle mechanism 40, and the second end of the second opening and closing valve 24b is also connected to the first end of the third opening and closing valve 24c. That is, when the working fluid flows toward the air spring 12 due to a pressure difference between the pressure tank 26 and the air spring 12, regardless of the throttle mechanism 40, that is, the compressor unit 30, the working fluid can pass through any one or both of the first flow passage system formed in the first opening and closing valve 24a and the fourth opening and closing valve 24d and the second flow passage system formed in the second opening and closing valve 24b and the third opening and closing valve 24c. In other words, when the working fluid flows due to the pressure difference, the working fluid does not pass through the compressor unit 30. Accordingly, it is possible to simplify the flow passage of the working fluid that flows due to the pressure difference, and reduce the occurrence of pressure loss during the flow of the working fluid.

In the vehicle height adjustment apparatus 10, basically, the working fluid flows toward the air spring 12 due to a pressure difference between the pressure tank 26 and the air spring 12. However, since the working fluid flows from the pressure tank 26 toward the air spring 12, the pressure difference between the pressure tank 26 and the air spring 12 may dissipate so as not to allow a sufficient flow of the working fluid. In addition, there may not be present a sufficient pressure difference (differential pressure) between the pressure tank 26 and the air spring 12 when a vehicle height increasing control operation is started. At this time, the ECU 56 drives the motor 34 of the compressor unit 30, and the compressor 36 forcibly draws the working fluid from the pressure tank 26, and pressure-feeds the working fluid toward the air spring 12.

Figure 3:
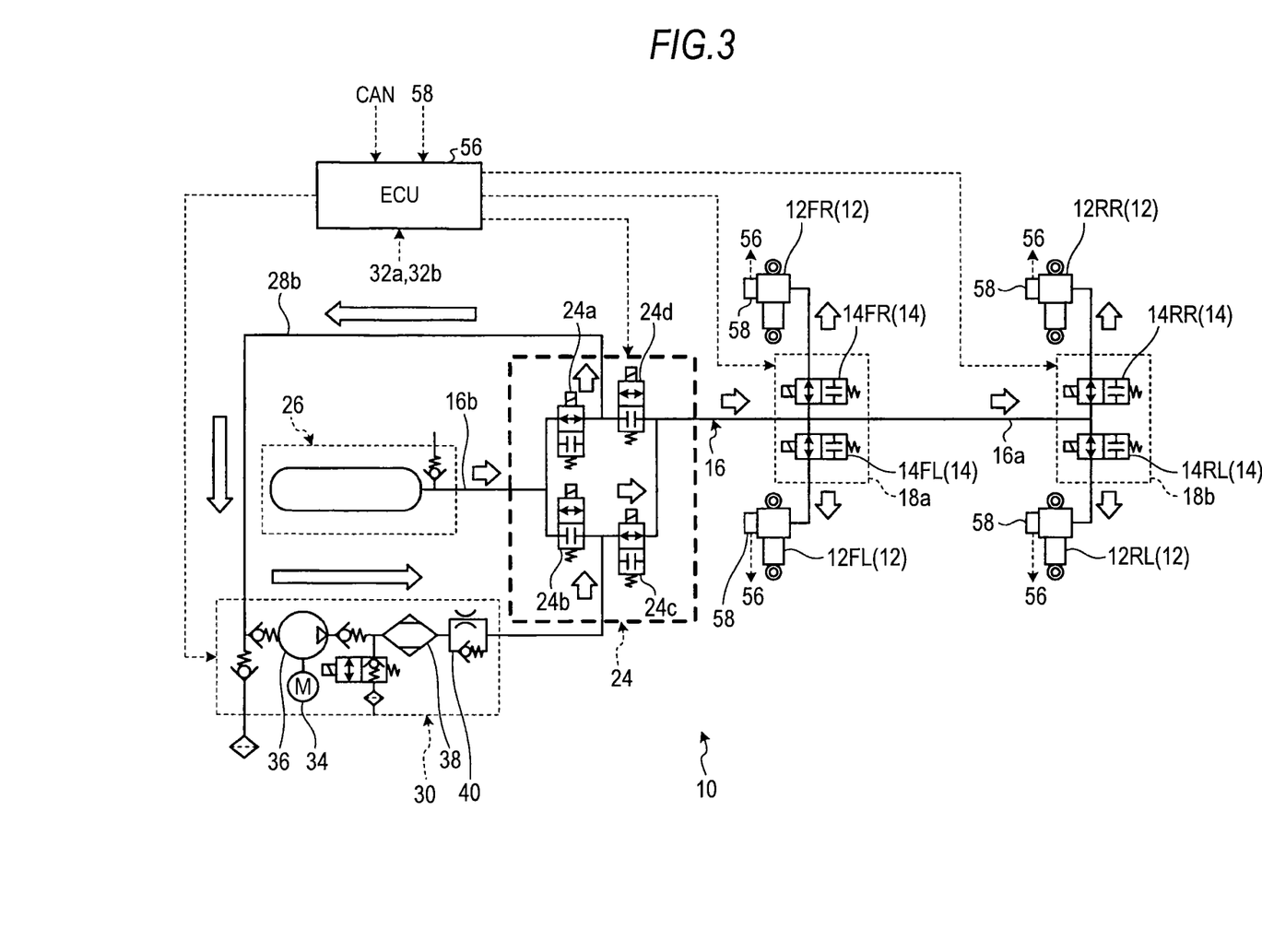
FIG. 3 is a diagram illustrating the state of opening and closing valves and the flow of the working fluid when the vehicle height adjustment apparatus of the embodiment performs a vehicle height increasing control operation with the compressor being driven.

In the operation of the vehicle height adjustment apparatus 10 illustrated in FIG. 3, when a vehicle height decreasing control operation is performed, the compressor 36 pressure-feeds the working fluid toward the air spring 12. When the vehicle height adjustment speed acquired by time-differentiating a vehicle height value supplied from each of the vehicle height sensors 58 is less than or equal to the predetermined threshold value, the ECU 56 switches the respective opening and closing states of the first opening and closing valve 24a, the second opening and closing valve 24b, the third opening and closing valve 24c, and the fourth opening and closing valve 24d, and drives the compressor 36 (the motor 34) to start the pressure feed of the working fluid. It is possible to determine the threshold value for the vehicle height adjustment speed to trigger the switching of the opening and closing states, via testing carried out in advance and the like. For example, it can be determined that the driving of the compressor 36 starts when the vehicle height increasing speed is less than or equal to 0.1 mm/s.

As illustrated in FIG. 3, when the vehicle height adjustment speed acquired by time-differentiating a vehicle height value supplied from each of the vehicle height sensors 58 is less than or equal to the predetermined threshold value, the ECU 56 brings the first opening and closing valve 24a into an opening state, and the fourth opening and closing valve 24d into a closing state. At this time, the pressure tank 26 and the compressor 36 are brought into communication with each other. The second opening and closing valve 24b is closed, and the third opening and closing valve 24c is opened. At this time, the compressor 36 and the air spring 12 are brought into communication with each other. As a result, the working fluid in the pressure tank 26 is drawn into the compressor 36 via the tank connection main flow passage 16b, the first opening and closing valve 24a, and the compressor inlet flow passage 28b by the driving of the compressor 36. The drawn working fluid is compressed, and pressure-fed toward the air spring 12 via the compressor outlet flow passage 28a and the third opening and closing valve 24c. As a result, the air spring 12 can be controlled to increase the vehicle height even when there is no sufficient pressure difference between the pressure tank 26 and the air spring 12. At this time, the vehicle height increasing speed is determined by the output of the compressor 36, that is, the output of the motor 34. For this reason, the ECU 56 controls the output of the motor 34 in response to a demanded vehicle height increasing speed, for example, a high-speed vehicle height increasing demand or a low-speed vehicle height increasing demand. Even when the vehicle height increasing speed is changed multiple times in one vehicle height increasing process as described above, the ECU 56 preferably controls the output of the motor 34.

As described above, before or while a vehicle height increasing control operation is performed, when there is present a pressure difference between the pressure tank 26 and the air spring 12, but the weight of the vehicle is increased, for example, when the number of occupants increases, or when the amount of cargo increases, a load which the air spring 12 has to support increases, thereby contracting the air spring 12. As a result, the pressure of the air spring 12 increases, and a pressure difference (differential pressure) between the pressure tank 26 and the air spring 12 may dissipate. Even in this case, the vehicle height increasing speed decreases. It is possible to detect these conditions based on the detected values of the vehicle height sensors 58. Accordingly, the ECU 56 can control the compressor 36 to start the pressure feed of the working fluid at an appropriate time.

Subsequently, the operation of the vehicle height adjustment apparatus 10 during the execution of a vehicle height decreasing control operation will be described with reference to FIG. 4. For example, when acquiring a vehicle height decreasing demand via the CAN, the ECU 56 switches the opening and closing states of the first opening and closing valve 24a, the second opening and closing valve 24b, the third opening and closing valve 24c, and the fourth opening and closing valve 24d. As a result, it is possible to draw the working fluid from the air spring 12, and return the working fluid back to the pressure tank 26 (pressure-feed the working fluid toward the pressure tank 26), using the compressor 36, and it is possible to contract the air spring 12, and decrease the vehicle height.

Figure 4:
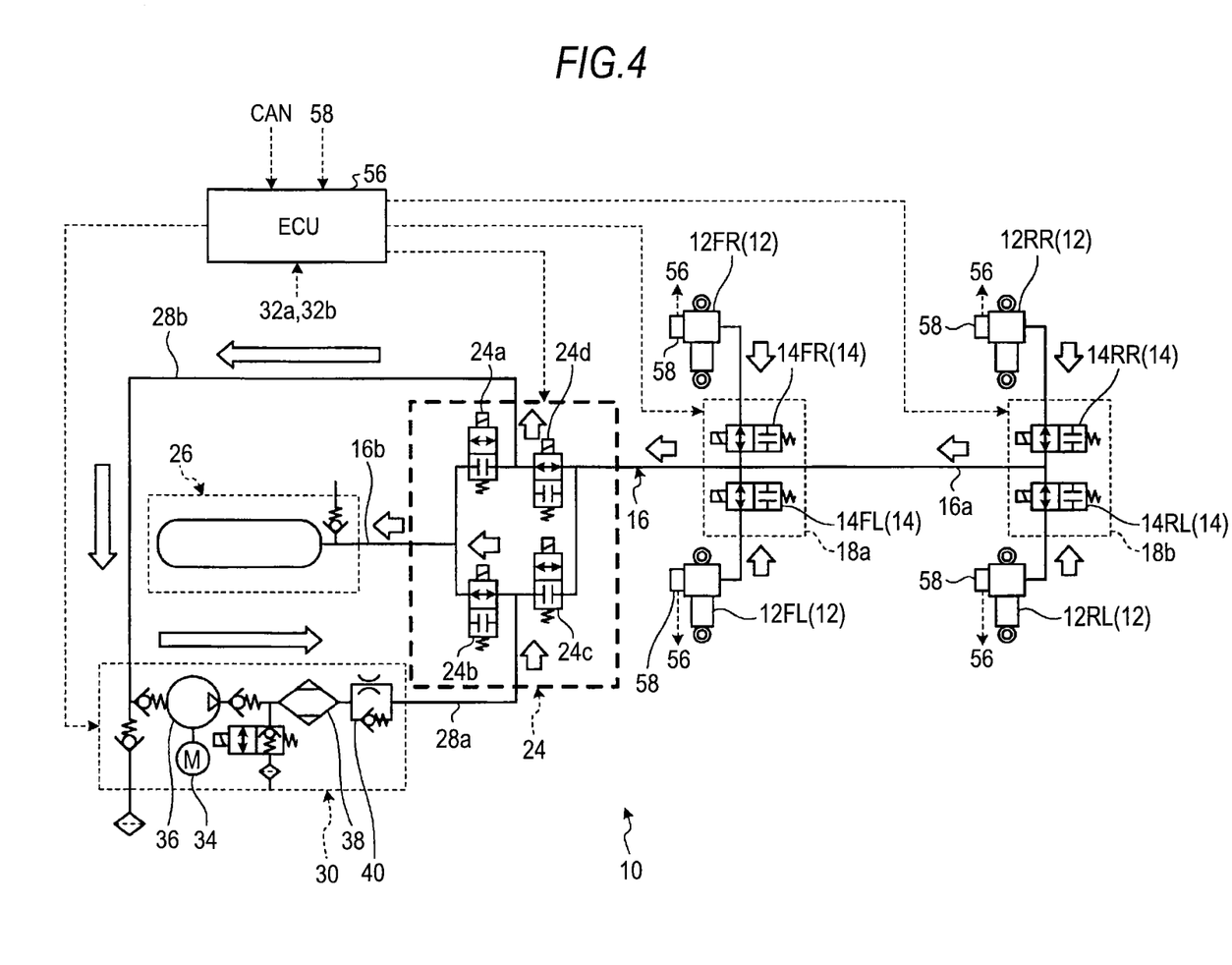
FIG. 4 is a diagram illustrating the state of opening and closing valves and the flow of the working fluid when the vehicle height adjustment apparatus of the embodiment performs a vehicle height decreasing control operation with the compressor being driven.

As illustrated in FIG. 4, when a vehicle height decreasing control operation is performed, the ECU 56 brings the first opening and closing valve 24a into a closing state, and the fourth opening and closing valve 24d into an opening state. The second opening and closing valve 24b is opened, and the third opening and closing valve 24c is maintained to be closed. The vehicle height adjustment valves 14FR, 14FL, 14RR, and 14RL are opened. As a result, the air spring 12 and the compressor 36 are brought into communication with each other via the fourth opening and closing valve 24d and the compressor inlet flow passage 28b. The outlet of the compressor 36 communicates with the pressure tank 26 via the compressor outlet flow passage 28a, the second opening and closing valve 24b, and the tank connection main flow passage 16b. The working fluid of the air spring 12 is drawn and pressure-fed to the pressure tank 26 by the compressor 36.

When a vehicle height decreasing control operation is performed, the vehicle height decreasing speed depends on a speed at which the working fluid is drawn by the compressor 36. That is, since the ECU 56 can arbitrarily adjust the output of the motor 34, the ECU 56 can arbitrarily select the vehicle height decreasing speed. Accordingly, the ECU 56 increases the output of the motor 34 when it is necessary to increase the vehicle height decreasing speed, and the ECU 56 decreases the output of the motor 34 when it is necessary to decrease the vehicle height decreasing speed. For example, when the occupants including a driver park (stop) the vehicle, and move away from the vehicle, the ECU 56 may notify the occupants of the fact that the vehicle is in a resting state. At this time, it is possible to demonstrate that the vehicle comes into a resting state by itself by quickly decreasing the vehicle height lower than a normal vehicle height in a period in which the occupants including the driver stay in the vicinity of the vehicle, for example, for a few seconds after the driver turns off a drive source of the vehicle, deboards the vehicle, and locks the doors. It is possible to decrease the vehicle height in a speed range in which the occupant does not have discomfort while stable travelling is maintained, when stable travelling can be obtained by decreasing the vehicle height during the travelling.

The ECU 56 can adjust the amount of decreasing of the vehicle height by controlling a drive period of the compressor 36. For example, when the occupants including a driver park (stop) the vehicle, and move away from the vehicle, it is possible to demonstrate that the silhouette of the vehicle while being parked or stopped looks beautiful by decreasing the vehicle height. It is possible to prevent the theft of the wheels or the theft of the vehicle by decreasing the vehicle height. When the vehicle height decreasing control operation is performed, a sensor or the like preferably detects obstacles under the bottom surface of the vehicle and at the surroundings thereof in such a manner that the vehicle does not become damaged.

Figure 5:
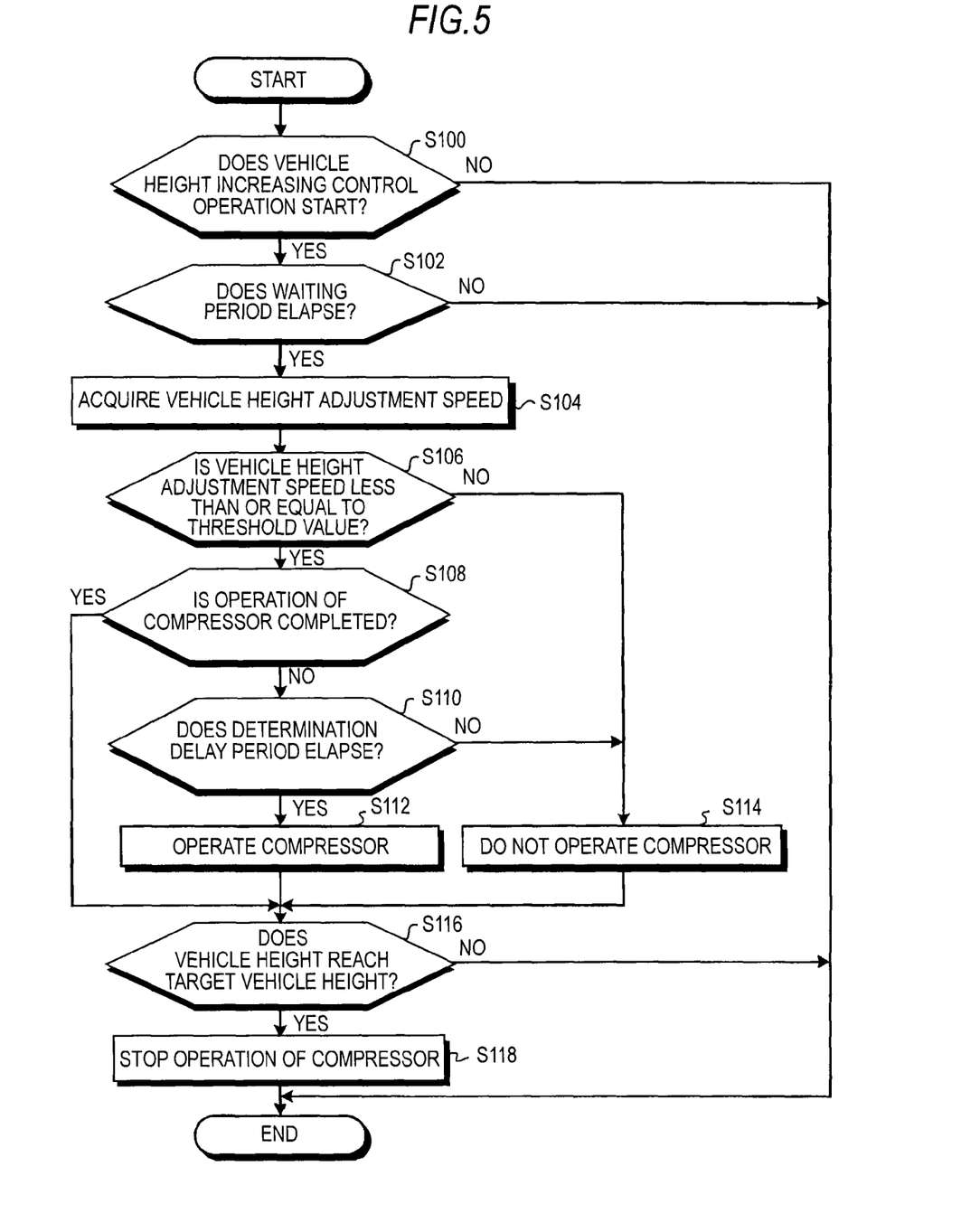
FIG. 5 is a flowchart illustrating the control of a compressor in the vehicle height adjustment apparatus according to the embodiment, using a vehicle height adjustment speed.

FIG. 5 is a flowchart illustrating how the compressor 36 is controlled using the vehicle height adjustment speed. The ECU 56 executes processes illustrated in the flowchart in FIG. 5 for a predetermined control period. The ECU 56 confirms whether a vehicle height increasing control operation for extending the air spring 12 starts, and when the vehicle height increasing control operation does not start (N in S100), the ECU 56 ends this process, and restarts a process from S100 for a subsequent control period. In contrast, when the vehicle height increasing control operation starts (Y in S100), and a predetermined waiting period (for example, one second) elapses after the vehicle height increasing control operation starts (Y in S102), the ECU 56 acquires (calculates) the vehicle height adjustment speed based on a vehicle height value supplied from each of the vehicle height sensors 58 (S104). Since the vehicle height sensors 58 are respectively disposed for the air springs 12 (12FR, 12FL, 12RR, and 12RL), and supply respective vehicle height values to the ECU 56, the ECU 56 acquires (calculates) the vehicle height adjustment speed of each of the air springs 12. When the predetermined waiting period does not elapse (N in S102), the ECU 56 ends this process, and restarts a process from S100 for a subsequent control period. Here, the provision of the predetermined waiting period avoids a decrease in detection accuracy which is caused by a response delay of the air spring 12 right after the vehicle height increasing control operation starts, or a variation in the vehicle height adjustment speed.

When the acquired vehicle height adjustment speed is less than or equal to the predetermined threshold value (Y in S106), and the operation of the compressor 36 is not completed (N in S108), the ECU 56 confirms whether the predetermined period (determination delay period) elapses. For example, the determination delay period can be set to one to two seconds. When the determination delay period elapses (Y in S110), the ECU 56 operates the compressor 36 (S112). That is, the compressor 36 pressure-feeds the working fluid, and thus the air spring 12 extends and the vehicle height continues to increase. At this time, the ECU 56 monitors the vehicle height adjustment speed of each of the air springs 12, and the ECU 56 may determine that it is necessary to operate the compressor 36 when the vehicle height adjustment speed of any one of the air springs 12 is less than or equal to the threshold value, or when the respective vehicle height adjustment speeds of a plurality of the air springs 12 are less than or equal to the threshold value.

When the determination delay period has not elapsed yet in S110 (N in S110), the ECU 56 brings the compressor 36 into a non-operation state (S114). That is, the ECU 56 assumes a possibility that the vehicle height adjustment speed becomes temporarily less than or equal to the threshold value due to unknown causes, and postpones the operation of the compressor 36. When the vehicle height adjustment speed is not less than or equal to the threshold value in S106 (N in S106), that is, when the vehicle height adjustment speed is high enough, the process proceeds to S114, and the operation of the compressor 36 is postponed. When the operation of the compressor 36 is already completed in S108 (Y in S108), the processes in S110 to S114 are skipped.

Subsequently, the ECU 56 determines whether the vehicle height value of each of the air springs 12 reaches a target vehicle height set at the start of the vehicle height increasing control operation, based on vehicle height values supplied from the vehicle height sensors 58, and when the vehicle height value reaches the target vehicle height (Y in S116), and the compressor 36 is in operation, the ECU 56 stops the compressor 36 (S118), ends this process, and restarts a process from S100 for a subsequent control period. When the vehicle height value does not reach the target vehicle height in S116 (N in S116), the ECU 56 ends this process, and restarts a process from S100 for a subsequent control period.

As such, the vehicle height adjustment apparatus 10 of the embodiment can control the compressor 36 at an appropriate time, based on the detected results (vehicle height values) of the vehicle height sensors 58. As a result, it is possible to remove a pressure sensor required for controlling the compressor 36 in the related art, and reduce the number of components, simplify the structure, and achieve cost reductions.

Figure 6:
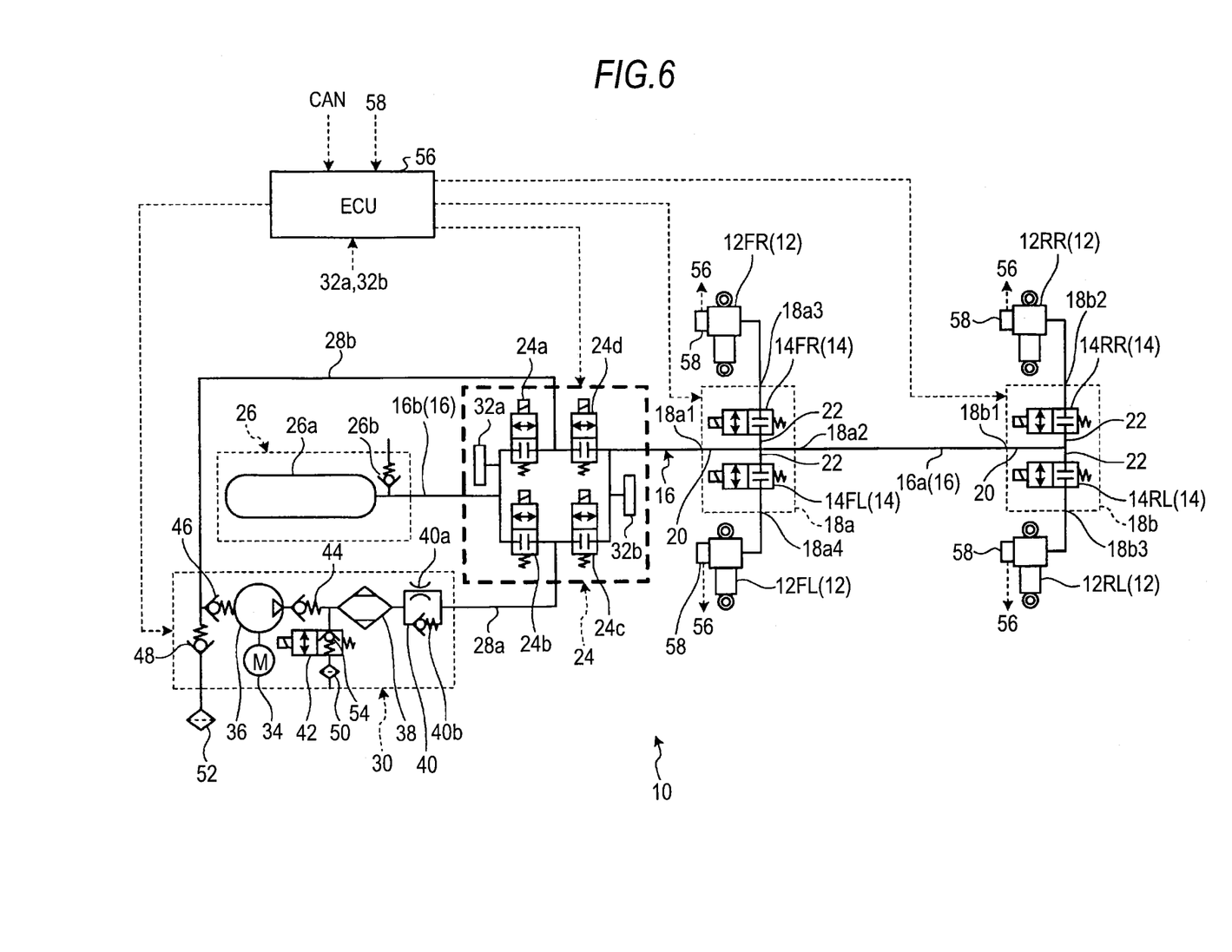
FIG. 6 is a diagram illustrating another configuration of the vehicle height adjustment apparatus according to the embodiment.

FIG. 6 is a diagram illustrating another configuration of the vehicle height adjustment apparatus 10. Basic configurations are the same as those of the vehicle height adjustment apparatus 10 illustrated in FIG. 1, and the same reference signs are assigned to the same configurations, and the description thereof will be omitted. Compared to the vehicle height adjustment apparatus 10 illustrated in FIG. 1, the circuit valve block 24 of the vehicle height adjustment apparatus 10 illustrated in FIG. 6 includes a first pressure sensor 32a for detecting the pressure of the pressure tank 26, and a second pressure sensor 32b for detecting the pressure of the air spring 12 (the vehicle height adjustment unit and the front wheel valve unit 18a).

For example, when the first opening and closing valve 24a and the second opening and closing valve 24b are closed, the first pressure sensor 32a can accurately detect the static pressure of the pressure tank 26. When at least one of the first opening and closing valve 24a and the second opening and closing valve 24b is opened and the working fluid flows through the channel, the first pressure sensor 32a can detect the dynamic pressure of the pressure tank 26. Similarly, when the third opening and closing valve 24c and the fourth opening and closing valve 24d are closed, and at least one of the respective vehicle height adjustment valves 14FR and 14FL of the front wheels is opened, the second pressure sensor 32b can detect the static pressure of the air spring 12. When the third opening and closing valve 24c and the fourth opening and closing valve 24d are closed, the vehicle height adjustment valves 14RR and 14RL are closed, and one of the vehicle height adjustment valves 14FR and 14FL is opened, the second pressure sensor 32b can detect the static pressure of any one of the respective air springs 12FR and 12FL of the front wheels. When both of the vehicle height adjustment valves 14FR and 14FL are opened, the second pressure sensor 32b can detect an average static pressure of the air springs 12FR and 12FL. When the third opening and closing valve 24c and the fourth opening and closing valve 24d are closed, the vehicle height adjustment valves 14FR and 14FL are closed, and one of the vehicle height adjustment valves 14RR and 14RL is opened, the second pressure sensor 32b can detect the static pressure of any one of the respective air springs 12RR and 12RL of the rear wheels. When both of the vehicle height adjustment valves 14RR and 14RL are opened, the second pressure sensor 32b can detect an average static pressure of the air springs 12RR and 12RL. When the third opening and closing valve 24c and the fourth opening and closing valve 24d are closed, the vehicle height adjustment valves 14FR, 14FL, 14RR, and 14RL are opened, and the second pressure sensor 32b can detect the static pressure of the entirety of the air springs 12FR, 12FL, 12RR, and 12RL that correspond to the entirety of the wheels, respectively. When the third opening and closing valve 24c or the fourth opening and closing valve 24d is opened, the second pressure sensor 32b can detect the dynamic pressure of the air spring 12 (the vehicle height adjustment unit, the front wheel valve unit 18a, and the rear wheel valve unit 18b).

As such, the first pressure sensor 32a can detect the pressure (static pressure or dynamic pressure) of an upstream side (for example, the pressure tank 26) of the circuit valve block 24, and the second pressure sensor 32b can detect the pressure (static pressure or dynamic pressure) of a downstream side (for example, the air spring 12) of the circuit valve block 24. As described above, since the working fluid flows from the pressure tank 26 toward the air spring 12 due to a pressure difference (differential pressure) between the pressure tank 26 and the air spring 12, the vehicle height can be adjusted. In other words, since a small pressure difference does not allow the flow of a sufficient amount of the working fluid for the adjustment of the vehicle height, it is necessary to drive the compressor unit 30. Accordingly, the vehicle height adjustment apparatus 10 illustrated in FIG. 6 can acquire (calculate) a pressure difference (differential pressure) based on the detected result of the first pressure sensor 32a and the second pressure sensor 32b, and control the driving of the compressor unit 30 based on the result, For example, when a vehicle height increasing control operation is performed, and the pressure difference between the pressure tank 26 and the air spring 12 is greater than or equal to a predetermined value (threshold value), the working fluid can flow from the pressure tank 26 toward the air spring 12 due to the pressure difference. At this time, the ECU 56 can bring a compressor 36 into a non-drive state. In contrast, when the pressure difference between the pressure tank 26 and the air spring 12 is less than the predetermined value (threshold value), and a vehicle height increasing control operation is continuously performed, the ECU 56 can drive the compressor 36 at that timing (timing at which the compressor 36 is required to pressure-feed the working fluid).

Since the configuration in FIG. 6 also includes the vehicle height sensors 58, as illustrated in FIG. 1, the ECU 56 can control the compressor 36, depending on whether the vehicle height adjustment speed, which is calculated from vehicle height values acquired by the vehicle height sensors 58, becomes less than or equal to the predetermined threshold value. Accordingly, with the configuration illustrated in FIG. 6, it is possible to control the compressor 36 using a first system based on the vehicle height sensors 58, and a second system based on the detected results of the first pressure sensor 32a and the second pressure sensor 32b, and it is possible to improve the reliability of the control. One of the first and second systems may be used as a main system, and the other may be used as a sub system.

The vehicle height adjustment apparatus 10 of the embodiment includes a total of four of the first opening and closing valve 24a, the second opening and closing valve 24b, the third opening and closing valve 24c, and the fourth opening and closing valve 24d, and switches the flow passage of the working fluid. As illustrated in FIGS. 1 to 4, each of the first opening and closing valve 24a, the second opening and closing valve 24b, the third opening and closing valve 24c, and the fourth opening and closing valve 24d can adopt a two-port opening and closing valve that has a simple configuration and is relatively cheap. As illustrated in FIGS. 2 to 4, it is possible to switch the flow mode (flow passage or flow direction) of the working fluid by changing the combination of the respective opening and closing states of the first opening and closing valve 24a, the second opening and closing valve 24b, the third opening and closing valve 24c, and the fourth opening and closing valve 24d, and obtain a cost reduction or a simplified design of the flow passage.

The embodiment illustrates the example in which when the vehicle height increasing control operation is performed, the ECU 56 selects at least one of the first and second flow passage systems, the first flow passage system being formed when the first opening and closing valve 24a and the fourth opening and closing valve 24d are opened, and the second flow passage system being formed when the second opening and closing valve 24b and the third opening and closing valve 24c are opened. In another embodiment, when the vehicle height increasing control operation is performed, the ECU 56 may use both of the first and second flow passage systems at all times. At this time, it is possible to improve the ease of flow of the working fluid, increase the vehicle height increasing speed compared to the case in which any one of the first and second flow passage systems is selected, and quickly adjust the vehicle height. It is not necessary to selectively control the opening and closing valves of the circuit valve block 24 when the vehicle height increasing control operation is performed, and a control logic becomes simplified.

In the above-mentioned embodiment, when the vehicle height adjustment control operation (increasing control operation or decreasing control operation) is performed, the vehicle height adjustment apparatus 10 increases or decreases the air springs 12 simultaneously, but the air springs 12 may be adjusted by individually controlling the respective vehicle height adjustment valves 14. For example, when the working fluid is supplied with the rear wheel valve unit 18b being closed and the front wheel valve unit 18a being opened, it is possible to adjust the vehicle height for only the front wheels via the respective air springs 12FR and 12FL of the front wheels. Similarly, when the working fluid is supplied with the front wheel valve unit 18a being closed and the rear wheel valve unit 18b being opened, it is possible to adjust the vehicle height for only the rear wheels via the respective air springs 12RR and 12RL of the rear wheels. When the working fluid is supplied with the vehicle height adjustment valves 14FR and 14RR being opened and the vehicle height adjustment valves 14FL and 14RL being closed, it is possible to adjust the vehicle height for only the respective air springs 12FR and 12RR of the right wheels. In contrast, when the working fluid is supplied with the vehicle height adjustment valves 14FL and 14RL being opened and the vehicle height adjustment valves 14FR and 14RR being closed, it is possible to adjust the vehicle height for only the respective air springs 12FL and 12RL of the left wheels. Even at this time, since it is possible to adjust the vehicle height adjustment speed by the selection of the first flow passage system and/or the second flow passage system of the circuit valve block 24, it is possible to obtain the same effects as when the vehicle height is simultaneously adjusted for the four wheels.

The embodiment illustrates the closed type vehicle height adjustment apparatus 10. However, this disclosure can also be applied to substantially the same apparatus, for example, an apparatus that suctions the atmosphere (external air), compresses the atmosphere using the compressor 36, and supplies the atmosphere to the air spring 12 via the pressure tank 26, and it is possible to obtain the same effects.

An aspect of this disclosure is directed to a vehicle height adjustment apparatus including a plurality of vehicle height adjustment units that are respectively provided to correspond to wheels of a vehicle body, and adjust a vehicle height in response to the supply and discharge of a working fluid; a pressure tank that stores the working fluid; a compressor that pressure-feeds the working fluid; a plurality of opening and closing valves that are interposed between the vehicle height adjustment units and the pressure tank; a vehicle height acquisition unit that acquires a vehicle height value of each of the wheels; and a control unit that controls each of the vehicle height adjustment units to adjust a vehicle height, and controls the compressor. When a vehicle height adjustment speed, which is calculated from the vehicle height value acquired by each of the vehicle height acquisition units during a vehicle height increasing process, is less than or equal to a predetermined threshold value, the control unit drives the compressor to pressure-feed the working fluid to the vehicle height adjustment units. According to the aspect of this disclosure, it is possible to determine whether the driving of the compressor is required, and efficiently drive the compressor as necessary, based on the detected results of the vehicle height acquisition units that are used for other purposes in the related art, so as to mainly confirm whether the vehicle height reaches a target vehicle height.

In the vehicle height adjustment apparatus according to the aspect of this disclosure, the control unit may acquire the vehicle height adjustment speed by time-differentiating the vehicle height value. According to this configuration, it is possible to acquire the vehicle height adjustment speed in real time, monitor a supply state of the working fluid to be supplied to each of the vehicle height units, and control the compressor at an appropriate time.

In the vehicle height adjustment apparatus according to the aspect of this disclosure, when the vehicle height adjustment speed is continuously less than or equal to a predetermined threshold value for a predetermined period, the control unit may drive the compressor. According to this configuration, it is possible to correspond to a temporary decrease in the vehicle height adjustment speed. For example, when a vehicle load weight increases, air springs may be temporarily and excessively compressed. As a result, the vehicle height adjustment speed may decrease instantaneously. However, thereafter, the convergence of vibration due to the excessive compression of the air springs may address a phenomenon in which the vehicle height adjustment speed becomes less than or equal to the threshold value. That is, the provision of the predetermined delay period can prevent the compressor from being driven too sensitively at a time when the driving of the compressor is not required.

In the vehicle height adjustment apparatus according to the aspect of this disclosure, the plurality of opening and closing valves may include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. When the working fluid flows from the pressure tank to the vehicle height adjustment unit due to a pressure difference therebetween, the control unit may select at least one of a first flow passage system that is formed when the first and fourth opening and closing valves are opened, and a second flow passage system that is formed when the second and third opening and closing valves are opened. According to this configuration, it is possible to efficiently control the driving of the compressor, using the vehicle height acquisition units used for other purposes in the related art. It is possible to switch the ease of flow of the working fluid (flow rate of the working fluid) per unit time period by selecting the first flow passage system or the second flow passage system, or selecting both of the first and second flow passage systems. It is possible to increase and decrease a vehicle height increasing speed or switch the vehicle height increasing speed by switching the opening and closing states of the opening and closing valves.

In the vehicle height adjustment apparatus according to the aspect of this disclosure, the plurality of opening and closing valves may include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. When the working fluid flows from the pressure tank toward the vehicle height adjustment unit due to a pressure difference therebetween, the control unit may use a first flow passage system that is formed when the first and fourth opening and closing valves are opened, and a second flow passage system that is formed when the second and third opening and closing valves are opened. According to this configuration, it is possible to efficiently control the driving of the compressor, using the vehicle height acquisition units used for other purposes in the related art. It is possible to improve the ease of flow of the working fluid (flow rate of the working fluid) per unit time period, and perform a rapid vehicle height increasing control operation by using both of the first and second flow passage systems.

In the vehicle height adjustment apparatus according to the aspect of this disclosure, a fluid regeneration apparatus and a throttle mechanism may be disposed at the outlet of the compressor, and the second end of the second opening and closing valve and the first end of the third opening and closing valve may be connected to each other and the throttle mechanism. According to this configuration, even in a case where the driving of the compressor is efficiently controlled using the vehicle height adjustment unit used for other purposes in the related art, and the fluid regeneration apparatus is disposed to maintain the quality of the working fluid, when the working fluid flows from the pressure tank toward the vehicle height adjustment unit due to a pressure difference therebetween, the working fluid can flow from the second opening and closing valve toward the third opening and closing valve without passing through the fluid regeneration apparatus and the throttle mechanism at the outlet of the compressor which is one of the causes of pressure loss. As a result, it is possible to prevent a decrease in the vehicle height adjustment speed.

The embodiment and modification examples of this disclosure are described, but are presented just as examples, and are not intended to limit the scope of this disclosure. This new embodiment can be implemented in various forms, and omission, replacement, and changes can be made to this disclosure in various forms insofar as the omission, the replacement, and the changes do not depart from the scope of this disclosure. The embodiment or the modifications are included in the scope or the essentials of this disclosure, and included in this disclosure disclosed in the claims and the equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle height adjustment apparatus comprising:
a plurality of vehicle height adjustment units that are respectively provided to correspond to wheels of a vehicle body, and adjust a vehicle height in response to the supply and discharge of a working fluid;
a pressure tank that stores the working fluid;
a compressor that pressure-feeds the working fluid;
a plurality of opening and closing valves that are interposed between the vehicle height adjustment units and the pressure tank;
a vehicle height acquisition unit that acquires a vehicle height value of each of the wheels; and
a control unit that controls each of the vehicle height adjustment units to adjust a vehicle height, and controls the compressor,
wherein when a vehicle height adjustment speed, which is calculated from the vehicle height value acquired by each of the vehicle height acquisition units during a vehicle height increasing process, is less than or equal to a predetermined threshold value, the control unit drives the compressor to pressure-feed the working fluid to the vehicle height adjustment units.

2. The vehicle height adjustment apparatus according to claim 1,
wherein the control unit acquires the vehicle height adjustment speed by time-differentiating the vehicle height value.

3. The vehicle height adjustment apparatus according to claim 1,
wherein when the vehicle height adjustment speed is continuously less than or equal to a predetermined threshold value for a predetermined period, the control unit drives the compressor.

4. The vehicle height adjustment apparatus according to claim 1,
wherein the plurality of opening and closing valves include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and
when the working fluid flows from the pressure tank to the vehicle height adjustment unit due to a pressure difference therebetween, the control unit selects at least one of a first flow passage system that is formed when the first and fourth opening and closing valves are opened, and a second flow passage system that is formed when the second and third opening and closing valves are opened.

5. The vehicle height adjustment apparatus according to claim 4, wherein a fluid regeneration apparatus and a throttle mechanism are disposed at the outlet of the compressor, and the second end of the second opening and closing valve and the first end of the third opening and closing valve are connected to each other and the throttle mechanism.

6. The vehicle height adjustment apparatus according to claim 1, wherein the plurality of opening and closing valves include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and when the working fluid flows from the pressure tank toward the vehicle height adjustment unit due to a pressure difference therebetween, the control unit uses a first flow passage system that is formed when the first and fourth opening and closing valves are opened, and a second flow passage system that is formed when the second and third opening and closing valves are opened.

* * * * *